(12) United States Patent
Chen

(10) Patent No.: US 7,523,565 B1
(45) Date of Patent: Apr. 28, 2009

(54) SHOES COMPRISING AIR CUSHIONING SYSTEM, AIR LIGHTWEIGHT SYSTEM, AND AIR PRESSURE ALERT SYSTEM

(76) Inventor: Kuang Ming Chen, 204 Spring Valley Rd., Paramus, NJ (US) 07652

( * ) Notice: Subject to any disclaimer, the term of this patent is extended or adjusted under 35 U.S.C. 154(b) by 360 days.

(21) Appl. No.: 11/358,805

(22) Filed: Feb. 21, 2006

(51) Int. Cl.
*A43B 13/20* (2006.01)
(52) U.S. Cl. .............................................. 36/29; 36/88
(58) Field of Classification Search ...................... 36/28, 36/29, 88, 93, 153
See application file for complete search history.

(56) References Cited

U.S. PATENT DOCUMENTS

| | | | |
|---|---|---|---|
| 2,600,239 A | | 6/1952 | Gilbert |
| 3,974,491 A | * | 8/1976 | Sipe ......................... 340/573.1 |
| 4,610,099 A | | 9/1986 | Signori |
| 4,864,738 A | * | 9/1989 | Horovitz ......................... 36/29 |
| 4,974,344 A | | 12/1990 | Ching |
| 5,014,449 A | | 5/1991 | Richard et al. |
| 5,333,397 A | | 8/1994 | Hausch |
| 5,685,090 A | | 11/1997 | Tawney et al. |
| 5,771,606 A | * | 6/1998 | Litchfield et al. ............... 36/29 |
| 5,813,142 A | * | 9/1998 | Demon ........................... 36/29 |
| 5,815,949 A | | 10/1998 | Sessa |
| 5,815,954 A | * | 10/1998 | Huang ......................... 36/132 |
| 5,916,664 A | | 6/1999 | Rudy |
| 5,933,983 A | | 8/1999 | Jean |
| 5,987,780 A | | 11/1999 | Lyden et al. |
| 6,031,463 A | * | 2/2000 | Bechmann .................. 340/666 |
| 6,134,812 A | | 10/2000 | Voss |
| 6,253,466 B1 | | 7/2001 | Harmon-Weiss et al. |
| 6,282,815 B1 | * | 9/2001 | Caston ........................... 36/29 |
| 6,314,663 B1 | * | 11/2001 | Saldana ......................... 36/28 |
| 6,354,020 B1 | * | 3/2002 | Kimball et al. ................ 36/29 |
| 6,571,490 B2 | * | 6/2003 | Tawney et al. ................. 36/29 |
| 6,865,825 B2 | * | 3/2005 | Bailey et al. .................. 36/88 |
| 6,892,477 B2 | * | 5/2005 | Potter et al. .................... 36/29 |
| 7,204,041 B1 | * | 4/2007 | Bailey et al. .................. 36/29 |
| 2003/0009913 A1 | * | 1/2003 | Potter et al. .................... 36/29 |
| 2003/0019128 A1 | * | 1/2003 | Litchfield et al. .............. 36/29 |

\* cited by examiner

*Primary Examiner*—Marie Patterson

(57) ABSTRACT

The present invention provides a lightweight and cushioned shoe's outsole having a pneumatic air tube swirled inside the outsole.

Shoe's outsole of present invention becomes extremely lightweight and cushioning when the pneumatic air tube inside the outsole is inflated.

The present invention provides an air mattress type inflatable bladder of shoe's insole having honeycomb-like construction by using tuft inside the insole.

Shoe's insole of present invention becomes extremely bouncing and cushioning when the bladder of the insole is inflated.

The present invention provides an air pressure alert system having an air compressive and expandable device and a liquid capillary.

The air pressure of the shoe's outsole and shoe's insole of present invention is able to track through the functions of air pressure alert system of present invention.

4 Claims, 8 Drawing Sheets

SHOES COMPRISING AIR CUSHIONING SYSTEM, AIR LIGHTWEIGHT SYSTEM, AND AIR PRESSURE ALERT SYSTEM

BACKGROUND OF THE INVENTION

This invention relates generally to the field of shoe's structure and more specifically to an article of manufacture for shoes comprising air cushioning system, air lightweight system, air pressure alert system and process for making same.

This invention provides a special outsole which comprises an air tube type bladder. This invention provides a special insole which comprises an inflatable air mattress type bladder. This invention provides a special capillary pressure device which can track the air pressure level of the bladder in the outsole and insole.

The most shoes comprise upper and sole. A layer of insole is inserted between upper and sole, especially for athletic shoes to absorb the shock. The outsole materials of athletic shoes include rubber and cellular foam such as EVA sponge. The rubber outsole is durable and flexible, but it is not lightweight. Conversely, the cellular outsole is lightweight, but it is not durable.

Usually, rubber sponge and EVA foam are used as the insole material because they are resilient and shock absorbent. The shock-absorbing and lightweight are the important features of design for athletic shoes, and the air is the best shock absorber and weight reducer. For decades, many inventers proposed several air bladder design in outsole and insole to increase the capability of shock absorbing.

Such as U.S. Pat. No. 5,333,397, an inflatable bladder is formed primarily along the peripheral area of the heel portion in the insole.

In U.S. Pat. No. 4,610,099, a bladder is longitudinal disposed in the heel region and reduced the cushioning gradually toward forefoot in the outsole. In U.S. Pat. No. 5,987,780, the sealed tubular bladders are peripherally disposed in the outsole.

The air bladder mentioned in prior technology such as U.S. Pat. No. 4,610,099, U.S. Pat. No. 5,987,780, and others etc., either ball bladder or tubular bladder doesn't cover the entire area of foot. There are some area or portion not covered by bladder.

The outsole of present invention comprising air tube which distributes entire outsole provides excellent cushion and extremely lightweight.

The insole of present invention comprising inflatable air bladder provides superior cushion covering entire sole of the feet.

BRIEF SUMMARY OF THE INVENTION

The primary object of the invention is to provide the extreme lightweight of the shoes. Another object of the invention is to provide the excellent cushion of the shoes. Another object of the invention is to provide the air pressure tracking design to maintain the lightweight and cushioning functions of the shoes.

Other objects and advantages of the present invention will become apparent from the following descriptions, taken in connection with the accompanying, wherein, by way of illustration and example, an embodiment of the present invention is disclosed.

In accordance with a preferred embodiment of the invention, there is disclosed that the invention provides an air cushion and lightweight system comprising pneumatic air tube swirled inside the outsole and inflatable air bladder insole covering entire sole of the feet.

In accordance with a preferred embodiment of the invention, there is disclosed that an air passage tube is connected between outsole and insole. When both insole and outsole are inflated, the shoe provides superior shock absorbing and extreme lightweight.

In accordance with a preferred embodiment of the invention, there is disclosed that a capillary pressure device is attached to counter back of the shoe and connected to outlet port of air tube in outsole for detecting the level of air pressure.

The present invention provides a lightweight and cushioned shoe's outsole having a pneumatic air tube swirled inside the outsole.

Shoe's outsole of present invention becomes extremely lightweight and cushioning when the pneumatic air tube inside the outsole is inflated.

The present invention provides an air mattress type inflatable bladder of shoe's insole having honeycomb-like construction by using tuft inside the insole. Shoe's insole of present invention becomes extremely bouncing and cushioning when the bladder of the insole is inflated.

The present invention provides an air pressure alert system having an air compressive and expandable device and a liquid capillary.

The air pressure of the shoe's outsole and shoe's insole of present invention is able to track through the functions of air pressure alert system of present invention.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

REFERENCE NUMBER IN DRAWINGS 10 is the outsole formed by combination of top half outsole and bottom half outsole.

11 is the air outlet port of outsole formed by combination of top half air outlet port and bottom half air outlet port.

12 is the hiding bladder inserted in the outsole which is combined top half outsole and bottom half outsole.
13 is the air inlet port of outsole formed by combination of top half air inlet port and bottom half air inlet port.
14 is the top sheet of inflatable air bladder of insole.
15 the bottom sheet of inflatable air bladder of insole.
16 is the side sheet of inflatable air bladder of insole.
17 is the tuft sheet of inflatable air bladder of insole.
18 is the port of air passage connected to outsole.
19 is an air inlet port.
20 is the air passage between outsole and insole.
21 is the upper part of shoe.
22 is a rigid tube connected between pneumatic air tube and air pressure transmission device.
23 is a pulling nut attached to the end of pneumatic air tube.
24 is a steel coil spring.
25 is an accordion type expandable and flexible tube.
26 is a capillary tube.
27 is the counter part of shoe.
28 is the bottom of shoe.
31 is the surface of joint area both on top half and bottom half outsole.
32 is the half cylinder channel hollow both in top and bottom half outsole.
33 is the half port of air inlet both in top half and bottom half outsole 4 is the half port of air outlet both in top half and bottom half outsole.
35 is the outer diameter of pneumatic air tube.
36 is the hollow of pneumatic air tube.
37 is the inner diameter of pneumatic air tube.
38 is a pneumatic air tube.
39 is body of half outsole both top and bottom.

DETAILED DESCRIPTION OF THE PREFERRED EMBODIMENT

Detail descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

While the invention has been described in connection with a preferred embodiment, it is not intended to limit the scope of the invention to the particular form set forth, but on the contrary, it is intended within the spirit and scope of the invention as defined by the appended claims.

Figure 1A:
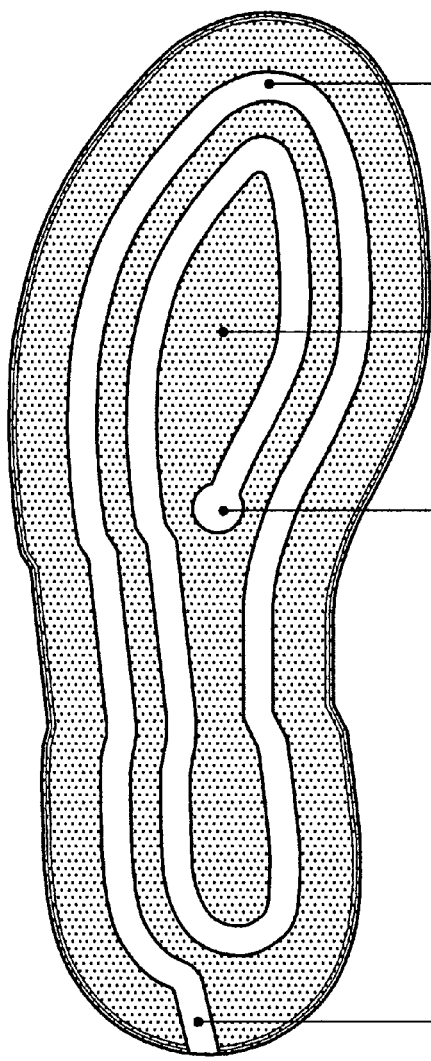
FIG. 1A is a top view of the bottom half of the outsole of invention.

FIG. 1A shows half bottom part of invention outsole 31 which the half bottom channel of tubular hollow 32 is distributed from half bottom air inlet port 33 along the edge line of outsole pattern swirling toward the half bottom air outlet port 34.

Figure 1B:
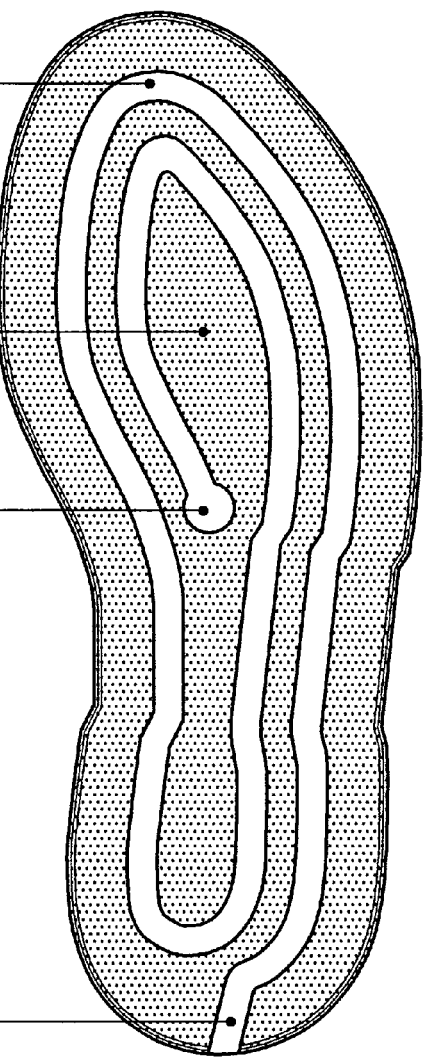
FIG. 1B is a bottom view of the top half of the outsole of invention.

FIG. 1B shows half top part of invention outsole 31 which the half top channel of tubular hollow 32 is distributed from top air inlet port 33 along the edge line of outsole pattern swirling toward the half top air outlet port 34.

Either half bottom part outsole 31 or half top part outsole 31 is fabricated by injection molding or compression molding and made from rubber or synthetic resins.

Figure 2:
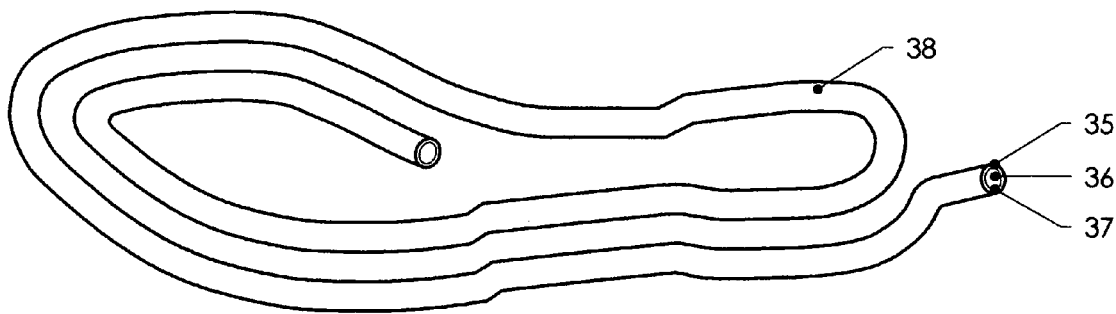
FIG. 2 is an isometric view of the pneumatic tube bladder of invention.

FIG. 2 shows the pneumatic tube bladder 38 which comprises outer diameter 35, inner diameter 37 and hole 36. There is a synthetic fiber coiling around the pneumatic bladder tube 38 to hold the shape of the tube when the tube is inflated. Otherwise, the deformation of the pneumatic bladder tube 38 would twist the shape of invention outsole.

Figure 3A:
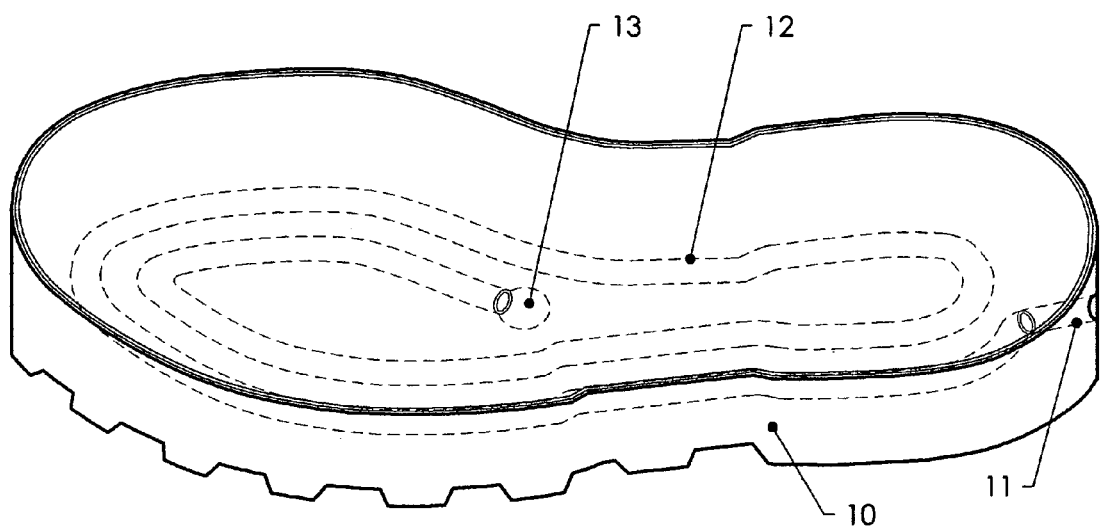
FIG. 3A is an isometric view of the outsole of invention.
Figure 3B:
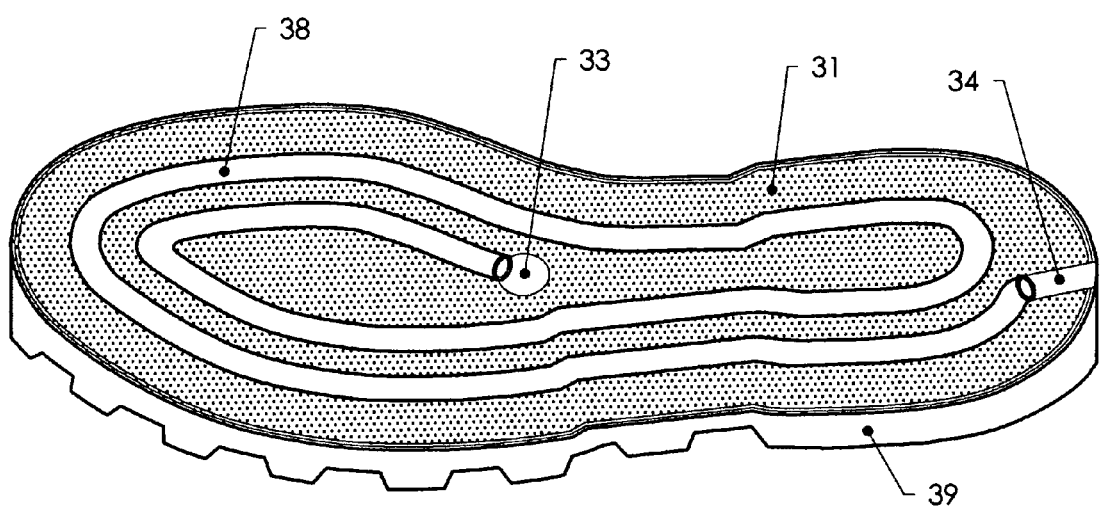
FIG. 3B is an isometric view of bottom half of outsole of invention with flexible pneumatic tube bladder inserted.

Turning to FIG. 3B first, then to FIG. 3A.

FIG. 3B shows the pneumatic bladder 38 is inserted in the half cylinder channel hollow 32 in bottom half outsole (FIG. 1A).

FIG. 3A shows the embodiment of invention outsole which is the combination of half bottom part outsole (FIG. 1A) and half top part outsole (FIG. 1B).

There is shown in FIG. 3A that the hiding pneumatic tube bladder 12 is inserted invisibly from outside in the channel of invention outsole, and it is the function of hiding pneumatic tube bladder 12 that makes the lightweight and cushioning of invention outsole.

In combination process, the surface of half bottom outsole 31 and the surface of half top outsole 31 are ground and coated with the adhesives. The half top air inlet port 33 should meet exactly to half bottom air inlet port 33, and the half top air outlet port 34 should meet exactly to the half bottom air outlet port 34.

After grinding and coating, half bottom part outsole (FIG. 1A) and half top part outsole (FIG. 1B) are bound together and placed in the mold, then the mold is placed in the autoclave to cure the adhesive. After curing, the outsole of present invention is shown as FIG. 3A which the hiding pneumatic tube bladder 12 is inflated creating the lightest weight sole and providing the superior cushion.

Figure 4:
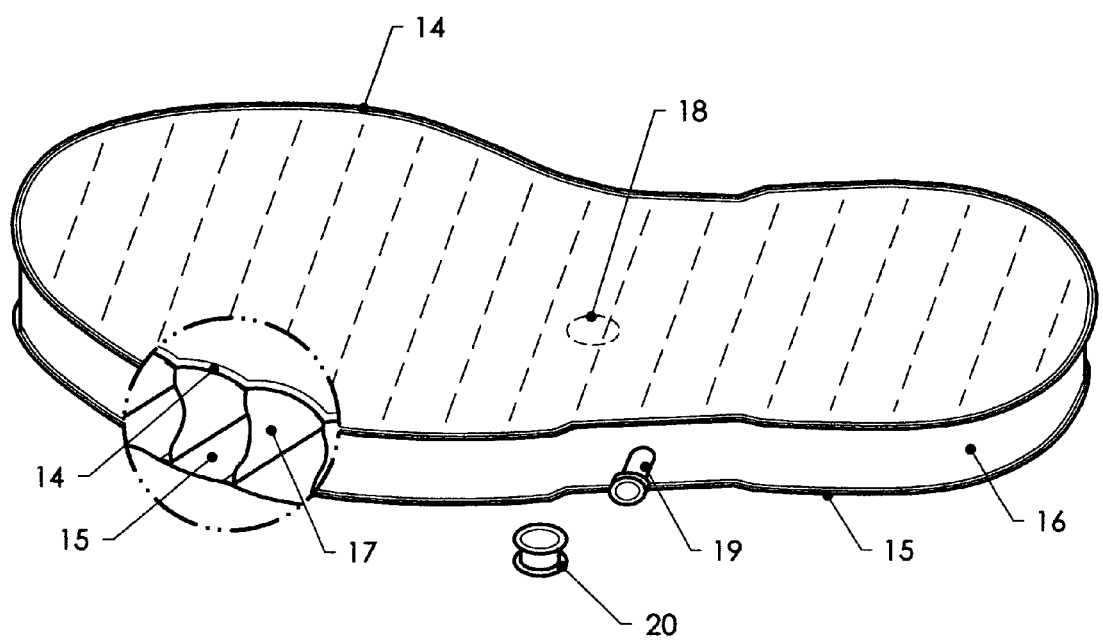
FIG. 4 is an isometric view of the insole of invention with enlarged detail.

Turning now to FIG. 4, the inflatable air bladder insole of the present invention is composed of top air barrier sheet 14, bottom air barrier sheet 15, side air barrier sheet 16 and air inlet valve 19. Between top air barrier sheet 14 and bottom air barrier sheet 15, there is a tuft strap 17 to connect the two sheets and maintaining the distance of top and bottom.

Also, in FIG. 3A and FIG. 4, there is an air passage 20 to connect the air outlet port of insole 18 and air inlet port of outsole 13. Therefore, the pressured air can inject from air inlet valve 19 into inflatable bladder insole passing through air passage 18 to air inlet port of outsole 13 and exhaling through air outlet port of outsole 11.

Figure 5:
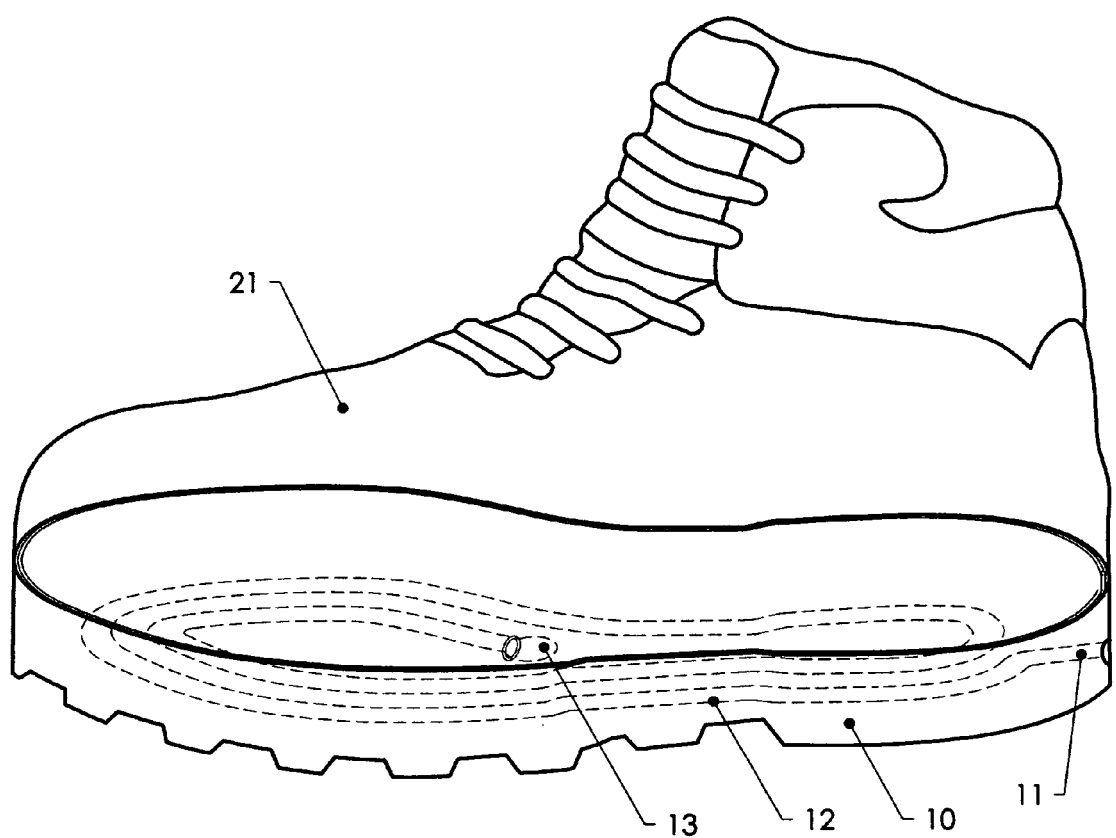
FIG. 5 is an isometric view of the outsole position in shoe of invention.

FIG. 5 shows the constructional position of outsole of present invention in the structure of shoe.

Figure 6:
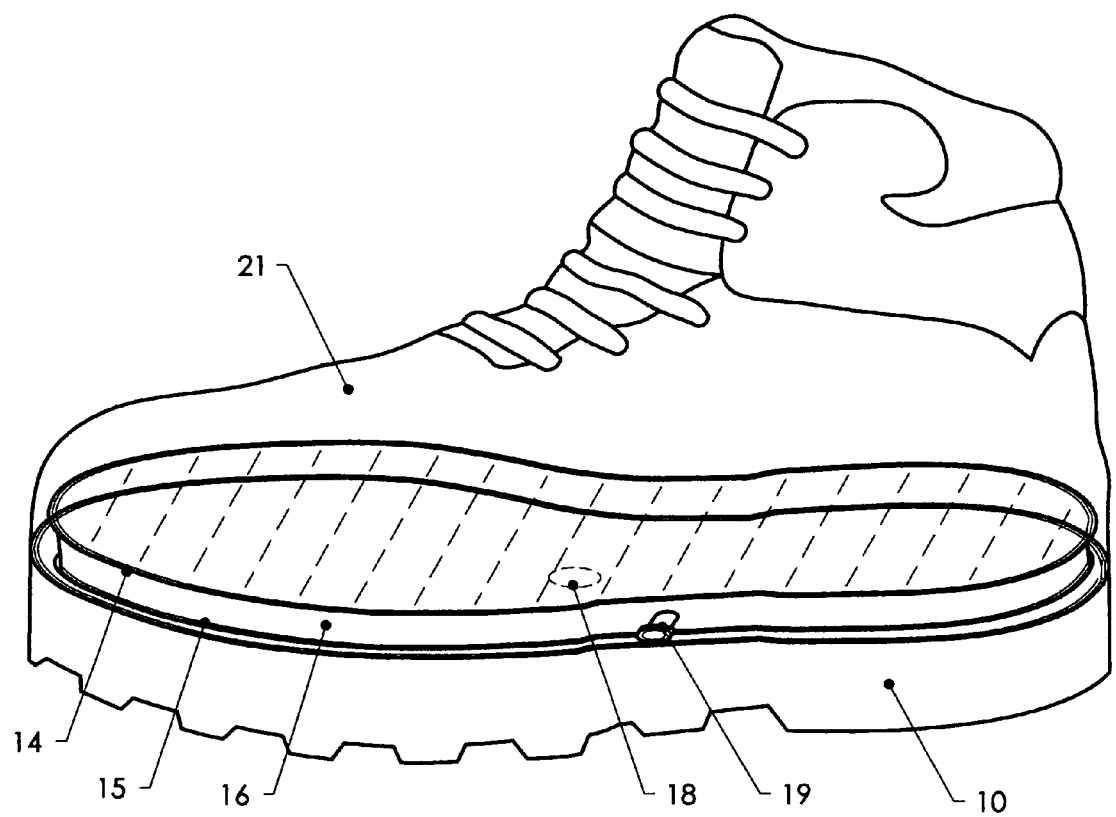
FIG. 6 is an isometric view of the insole position in shoe of invention.

FIG. 6 shows the constructional position of insole of present invention in the structure of shoe.

Figure 7:
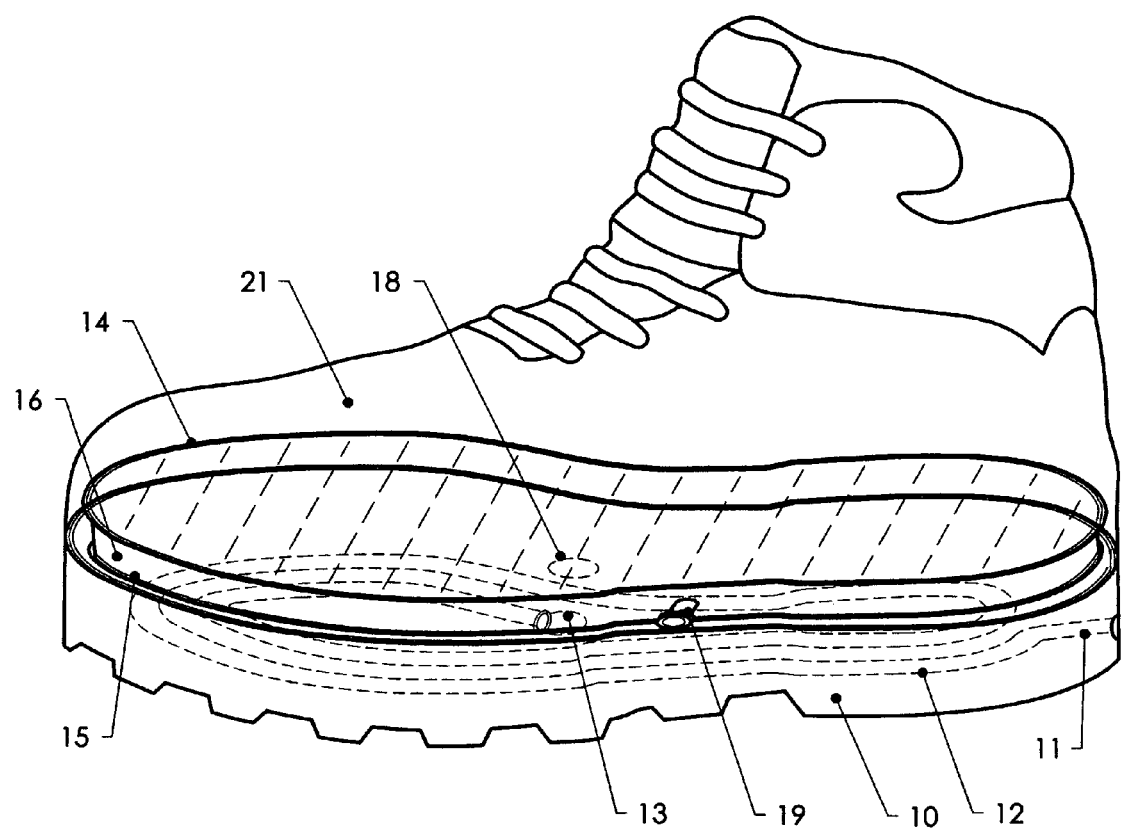
FIG. 7 is an isometric view of the combination of outsole and insole as a single unit in shoe of invention.

FIG. 7 shows the constructional position of outsole and insole of present invention in the structure of shoe.

Since the technology of present invention creates the lightest weight shoe sole including outsole and insole, the walker's body weight distributes more evenly to ease pressure point of the feet. This makes the walker's feet feeling less fatigue and like walking on air.

To assure the performances of light-weight and cushioning, the air pressure in the bladder of insole and outsole of this invention should be maintained within appropriate range. A pressure alert system of invention is installed in the counter area of the shoe to ensure the air pressure level in the bladder of insole and outsole of invention.

Figure 8:
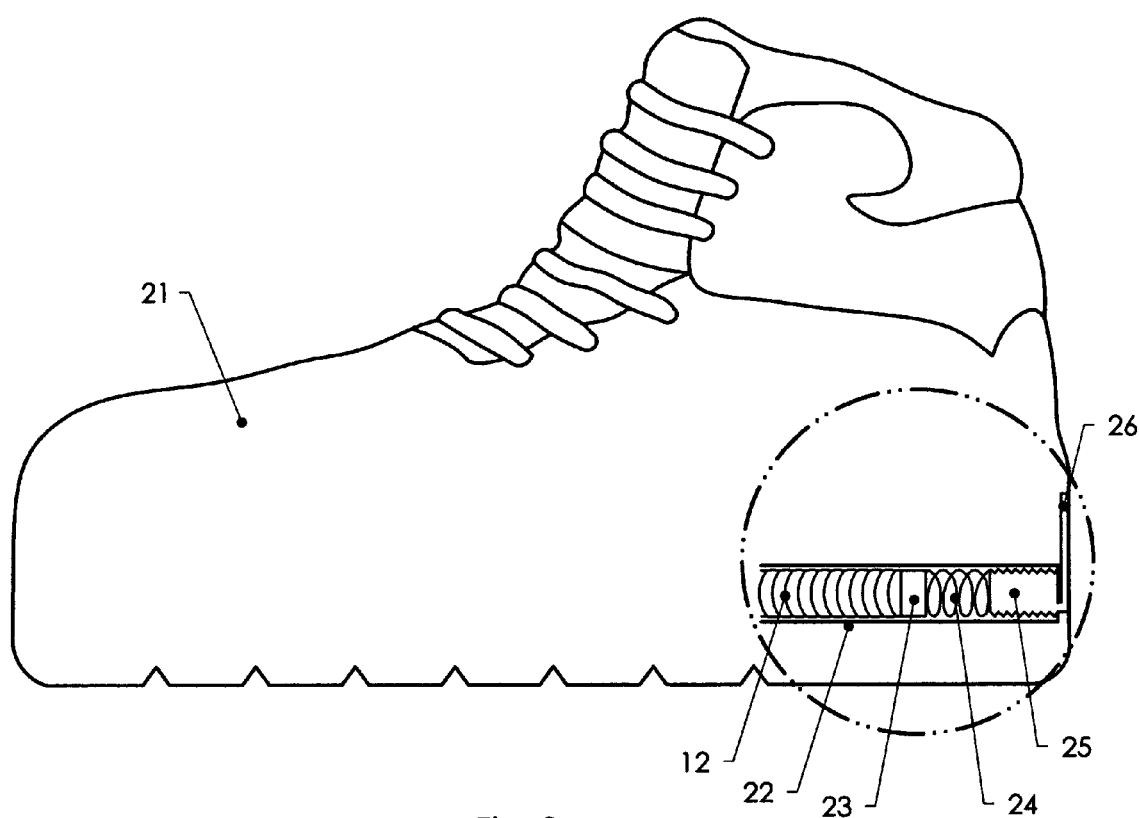
FIG. 8 is a cross sectional view of air pressure alert system and its position in shoe of invention.
Figure 9:
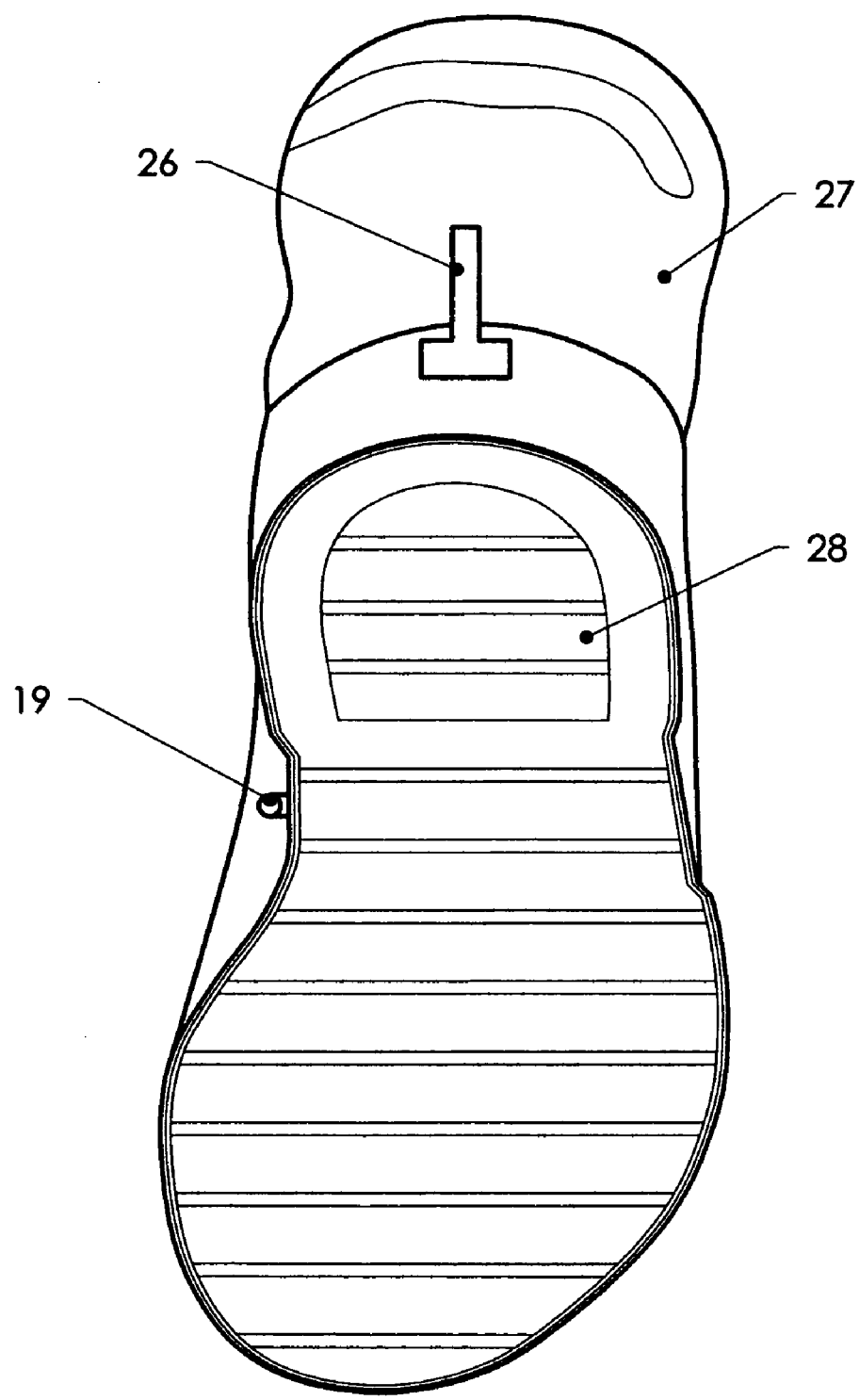
FIG. 9 is a prospective view from bottom showing the position of capillary device in shoe of invention

FIG. 8 shows the overall structure of both the air pressure transmission device and the air capillary device.

The air pressure transmission device 22 within the sole is connected to an air bladder on one side and to the capillary device 26 on the rear of the shoe.

The air pressure transmission device 22 is a cylinder tube containing a metal nut 23, a steel coil 24 and an accordion shaped tube 25.

The accordion shaped tube 25 is expandable and compressible. It is made from flexible thermoplastic resins or thermoplastic elastomers. Thermoplastic resins include, but not limited to, flexible PVC and thermoplastic polyurethane. Thermoplastic elastomers, on the other, include but not limited to, thermoplastic EP rubber (Ethylene-propylene copolymer) and thermoplastic SBS rubber (Styrene-butadiene-styrene block copolymer). Both types of thermoplastics are manufactured using a plastic injection molding machine.

The accordion shaped tube 25 stores a liquid including, but not limited to, water or alcohols. The liquid is dyed or pigmented to a brilliant shade of color.

The capillary device 26 connecting to the accordion shaped tube 25 is a capillary tube made of transparent plastic including, but not limited to, PVC, Acryl resin, and Polycarbonate resin.

The basic operation of the preferred embodiment containing the air pressure transmission device 22 and the capillary device 26 is as follows.

The air bladder within the shoe exerts a pressure to the metal nut 23 and compresses the steel coil 24.

The compressed steel coil 24 transmits the pressure to the accordion shaped tube 25.

Consequently, the colored liquid stored inside the accordion shaped tube 25 is pushed into the capillary tube 26.

The more pressure the air bladder exerts, the more colored liquid is forced into the capillary tube 26.

This process can also occur in reverse.

When the pressure in the air bladder is reduced, there is less pressure on the metal nut 23, thus releasing the tension in the steel coil 24. As a result, the steel coil 24 exerts less force against the accordion shaped tube 25 and the colored liquid inside the capillary tube 26 flows back to the accordion shaped tube 25 due to its expansion accordingly.

There are two lines, an upper and lower, on the capillary tube 25 marking the proper pressure range necessary for the air bladder to maintain. The upper line indicates the maximum allowable pressure while the lower line indicates the minimum required pressure.

FIG. 8 shows the structure of the device of air pressure alert system of invention. The pressure alert system of invention compromises of pressure transmission device 22 and capillary device 26 which the bottom of capillary device 26 is connected to the end of pressure transmission device 22.

Inside the pressure transmission device 22, the stopper 23 attached to the end of pneumatic air tube 12 in the invention outsole is connected to steel coil spring 24, and the steel coil spring 24 is connected to the accordion-like expandable container 25.

Then, the accordion-like expandable container 25 is connected to capillary device 26 which can track the pressure inside the bladder in outsole and insole of invention. The accordion-like expandable container 25 which holds the colored liquid such as dyed alcohols and others is made of rubber or flexible vinyl and others.

Capillary device 26 is made of transparent plastics such as acrylic resins, polycarbonate resins, polyester resins, rigid PVC resins and others.

While the bladder in outsole of invention 12 and the bladder in invention insole (FIG. 4) are fully inflated, the pressure air will compress the spring steel coil 24.

In turn, the pressure applied to spring steel coil 24 transfers and compresses the accordion-like expandable tank 25 where the colored liquid inside is pushed into the capillary 26.

By contrary, when the air pressure in the bladder of invention outsole 12 or the bladder of invention insole (FIG. 4) is deflated, the tension applied to spring steel coil 24 will be reduced.

In turn, the unloaded spring steel coil 24 withdraws the accordion-like expandable tank 25, and the colored liquid in capillary 26 flows reversely back to accordion-like expandable tank 25.

Therefore, the colored liquid column gets higher in capillary 26 if the air pressure of bladder in sole of invention is increasing.

Whereas, the colored liquid column gets lower in capillary 26 if the air pressure of bladder in sole of invention is decreasing.

In other words, the air pressure of bladder inside the sole of invention can be tracked by the range of colored liquid column in the capillary device 26.

There are marks, top limit line and bottom limit line, on capillary device 26 for alert purpose.

The top limit line indicates the maximum allowance of air pressure, and the bottom limit line indicates the minimum requirement of air pressure.

The pressure alert system of invention provides the warning if the air pressure in the sole of invention is over loaded or under loaded.

While the bladder inside the invention insole and invention outsole are fully inflated, the colored liquid will be pushed to the higher rank in capillary.

The air pressure of the bladder in the invention shoe's sole is easily checked in a glance by the air pressure alert system of this invention.

What is claimed is:

1. A shoe comprising:
 a sole,
 a bladder located inside the sole,
 a pressure alert system for detecting the air pressure of the bladder,
 the air pressure alert system comprises an air transmission device,
 the air transmission device comprising a metal nut, a steel coil, and an accordion shaped flexible plastic or rubber tube all contained within a cylinder tube, which receives pressure from the air bladder connected on the front end of the tube and transmits the pressure to an air capillary device connected on the back end located at the rear of the shoe.

2. The shoe as claimed in claim 1 wherein the air capillary device contains a capillary tube made from transparent plastic.

3. The shoe as claimed in claim 1 wherein the tube contains a colored liquid.

4. The shoe as claimed in claim 3 wherein the liquid is a dyed or pigmented liquid.

\* \* \* \* \*